(12) United States Patent
Malhotra et al.

(10) Patent No.: US 11,100,292 B2
(45) Date of Patent: *Aug. 24, 2021

(54) SYSTEMS AND METHODS FOR DISAMBIGUATING A TERM BASED ON STATIC AND TEMPORAL KNOWLEDGE GRAPHS

(71) Applicant: Rovi Guides, Inc., San Jose, CA (US)

(72) Inventors: Manik Malhotra, New Delhi (IN); Sashikumar Venkataraman, Andover, MA (US); Ahmed Nizam Mohaideen P., Kovilpatti (IN)

(73) Assignee: ROV GUIDES, INC., San Jose, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 16/696,695

(22) Filed: Nov. 26, 2019

(65) Prior Publication Data
US 2020/0097550 A1    Mar. 26, 2020

Related U.S. Application Data

(63) Continuation of application No. 15/223,698, filed on Jul. 29, 2016, now Pat. No. 10,503,832.

(51) Int. Cl.
*G06F 40/30* (2020.01)
*G06F 40/295* (2020.01)

(52) U.S. Cl.
CPC ............ *G06F 40/30* (2020.01); *G06F 40/295* (2020.01)

(58) Field of Classification Search
CPC ............................. G06F 40/30; G06F 40/295
See application file for complete search history.

(56) References Cited

U.S. PATENT DOCUMENTS

| | | | |
|---|---|---|---|
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |

(Continued)

OTHER PUBLICATIONS

Hoffart et al., "YAGO2: A spatially and temporally enhanced knowledge base from Wikipedia," Artificial Intelligence, 194:28-61 (2013).

(Continued)

*Primary Examiner* — Qian Yang
(74) *Attorney, Agent, or Firm* — Haley Guiliano LLP

(57) ABSTRACT

Systems and methods provided herein for a determining a meaning of an ambiguous term in a text segment based on a context term, a static knowledge graph and a temporal knowledge graph. These systems and methods access a first knowledge graph associated with the context term to determine a potential term that is the meaning of the unknown term. Upon determining that there are multiple potential terms in the first knowledge graph that could be the meaning of the unknown term, the systems and methods take into account the temporal dimension of relationships between entities for disambiguating the meaning of the unknown term. The systems and methods achieve this by determining a time stamp of the text segment and accessing a second knowledge graph associated with the first context term and related to the time stamp to determine the potential term that is the meaning of the first unknown term.

16 Claims, 7 Drawing Sheets

(56) References Cited

U.S. PATENT DOCUMENTS

| | | |
|---|---|---|
| 7,761,892 B2 | 7/2010 | Ellis et al. |
| 8,046,801 B2 | 10/2011 | Ellis et al. |
| 2002/0174430 A1 | 11/2002 | Ellis et al. |
| 2003/0110499 A1 | 6/2003 | Knudson et al. |
| 2005/0251827 A1 | 11/2005 | Ellis et al. |
| 2008/0040095 A1 | 2/2008 | Sinha et al. |
| 2010/0153885 A1 | 6/2010 | Yates |
| 2014/0142922 A1 | 5/2014 | Liang et al. |
| 2015/0039290 A1 | 2/2015 | Alexe et al. |
| 2015/0293904 A1 | 10/2015 | Roberts |
| 2016/0012020 A1 | 1/2016 | George et al. |
| 2016/0035347 A1 | 2/2016 | Agarwal et al. |
| 2016/0092447 A1 | 3/2016 | Venkataraman et al. |
| 2016/0094889 A1 | 3/2016 | Venkataraman et al. |
| 2017/0140059 A1 | 5/2017 | Li et al. |
| 2017/0228372 A1 | 8/2017 | Moreno et al. |
| 2017/0243127 A1 | 8/2017 | Zhu et al. |

OTHER PUBLICATIONS

Gutierrez et al., "Temporal RDF," Network and Parallel Computing, pp. 93-107 (2005).

International Search Report and Written Opinion in Application No. PCT/US2017/044396, dated Oct. 24, 2017.

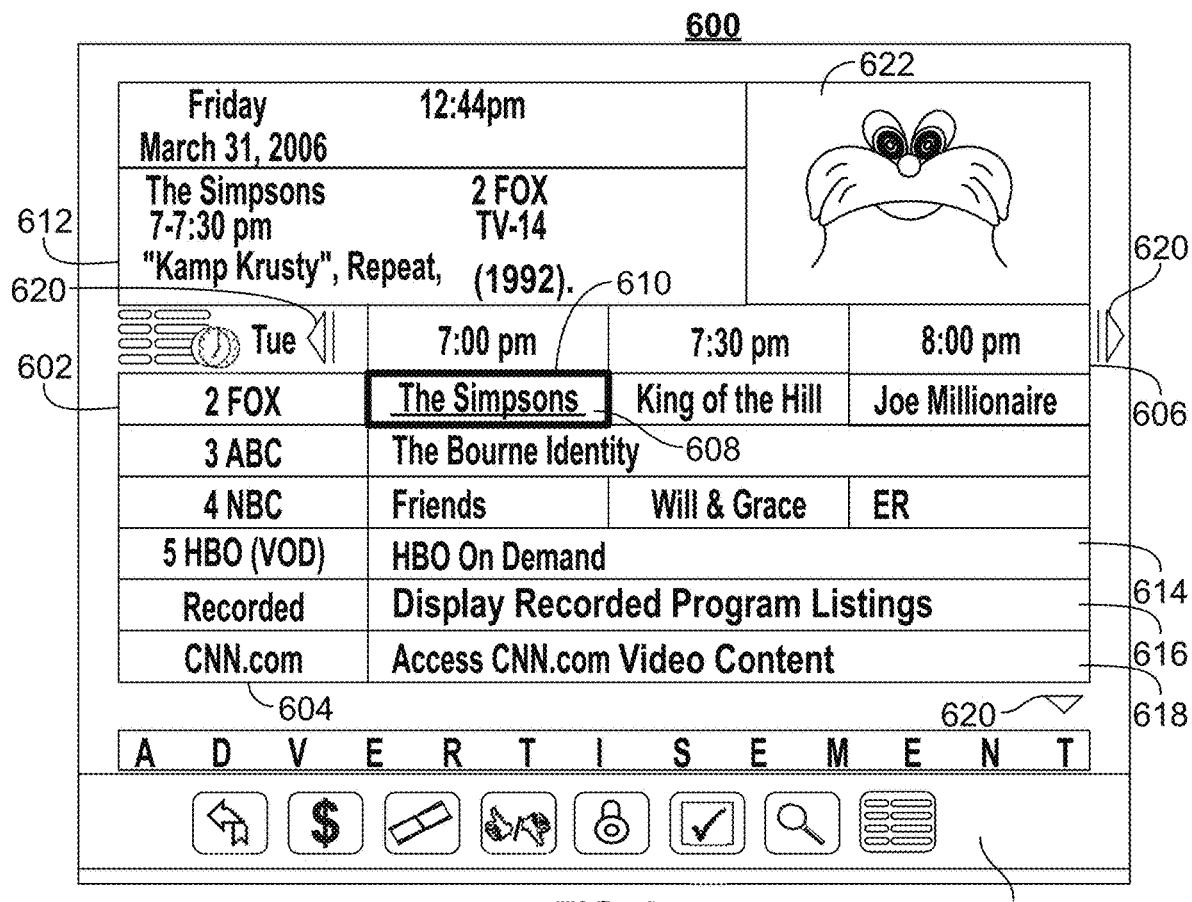

SYSTEMS AND METHODS FOR DISAMBIGUATING A TERM BASED ON STATIC AND TEMPORAL KNOWLEDGE GRAPHS

CROSS-REFERENCE TO RELATED APPLICATION

This application is a continuation of U.S. patent application Ser. No. 15/223,698, filed Jul. 29, 2016 (now allowed), which is hereby incorporated by reference herein in its entirety.

BACKGROUND

The amount of natural language text is rapidly increasing. In order for a system to extract, catalog and utilize information from natural language text, it is imperative for the system to correctly identify the meaning associated with a term presented in the text. This is a difficult task as many terms share the same common components and consequently, many terms in natural language text are ambiguous. Incorrect assignment of meanings to ambiguous terms in natural language text can decrease the efficiency of natural language processing and have a detrimental impact on user experience. For example, incorrect assignment of meanings to ambiguous terms in natural language text can decrease the accuracy of natural language queries, which relies heavily on natural language processing.

SUMMARY

Systems and methods are provided herein for determining a meaning of an ambiguous term in a text segment based on a context term, a static knowledge graph, and a temporal knowledge graph. These systems and methods, upon identifying an unknown term in a text segment, analyze the text segment for a context term. The systems and methods access a first knowledge graph (i.e., the static knowledge graph) associated with the context term to determine a potential term that is the meaning of the unknown term. The systems and methods determine that the unknown term is an ambiguous term upon determining that there is more than one potential term in the first knowledge graph that could be the meaning of the unknown term. In this case, the systems and methods take into account the temporal dimension of relationships between entities for disambiguating the meaning of the unknown term. The systems and methods achieve this by determining a time stamp of the text segment and accessing a second knowledge graph (i.e., the temporal knowledge graph) associated with the first context term and related to the time stamp to determine the potential term that is the meaning of the first unknown term.

In some aspects, an interactive media guidance application identifies a first unknown term in the text segment. For example, the interactive media guidance application may generate for display the text segment "Bernie Sanders has called out Clinton for soliciting donations from banks and corporations" for a user. The interactive media guidance application may determine that the term "Clinton" has no metadata or identifier tag associated with it that provides its meaning. In this case, the interactive media guidance application determines that the term "Clinton" is an unknown term. The interactive media guidance application analyzes the text segment for a first context term. The interactive media guidance application may use text mining techniques (e.g., named entity recognition, coreference, sentiment analysis, semantic analysis etc.) to determine the first context term. For example, the interactive media guidance application identifies "Bernie Sanders" as the first context term.

The interactive media guidance application determines a meaning of the first unknown term by accessing a first knowledge graph associated with the first context term to identify a potential term that is the meaning of the first unknown term. Knowledge repositories contain information about millions of entities and their relationships with other entities. Knowledge repositories contain information about entities from a wide variety of sources (e.g., encyclopedia, Wikipedia, news articles, social media, and other similar sources) and can provide comprehensive knowledge graphs associated with an entity. These knowledge graphs typically include all relationships between an entity and other entities accumulated over all periods of time. In some embodiments, the interactive media guidance application may identify a potential term that could be the meaning of the unknown term based on similarity between the potential term and the unknown term. For example, the first knowledge graph associated with the first context term "Bernie Sanders" may be derived from general knowledge corpus such as Wikipedia. The interactive media guidance application may identify terms "Bill Clinton," "Hillary Clinton" and "Ryan Clinton" as potential terms because of their similarity to the unknown term "Clinton."

In some embodiments, the interactive media guidance application may use a metadata descriptor of a term in the first knowledge graph to determine whether the term is a potential term. For example, the first knowledge graph may include the term "Secretary of State" and a portion of the associated metadata may be "Hillary Clinton." In this case, the interactive media guidance application may determine "Secretary of State" as a potential term. In some embodiments, the interactive media guidance application may use strength of association between a term and the first context term as a second step to filter out the most likely potential terms. Strength of association may be an inverse of normalized distance between two terms in the knowledge graph. For example, normalized strength of association between "Bernie Sanders" and each of "Bill Clinton," "Hillary Clinton," "Ryan Clinton," and "Secretary of State" is 0.7, 0.7, 0.2 and 0.2 respectively. If the required threshold strength of association is 0.5, then the interactive media guidance application may determine, based on the first knowledge graph, that terms "Bill Clinton" and "Hillary Clinton" are potential terms that could be the meaning of the first unknown term.

The interactive media guidance application determines whether the first knowledge graph includes more than one potential term that could be the meaning of the first unknown term. For example, the interactive media guidance application may use a Boolean comparison function to determine whether the value of a counter corresponding to the number of potential terms is greater than one. Upon determining that the first knowledge graph includes more than one potential term that could be the meaning of the first unknown term, the interactive media guidance application determines a time stamp associated with the text segment. The time stamp can be any period of time, depending on the origin and content of the text segment. For example, if the text segment is a report detailing changes in campaign donation policies during 2010 to 2016, the time stamp may be 2010 to 2016. For a social media status update (e.g., a Twitter post) or a natural language query, the time stamp may be the exact date and time of the update or query. The time stamp is used to derive information about the time that the content of the text segment relates to.

The interactive media guidance application may use metadata associated with the text segment to determine the time stamp. For example, online articles may have a date of origin associated with them. Alternatively, the interactive media guidance application may use text mining techniques to extract time indicators from the text segment itself. For example, the text segment may contain dates of events detailed in the text segment (e.g., "On Jan. 11, 2016, Bernie Sanders called out Clinton . . . ") or other contextual information that may be used to extrapolate the time stamp (e.g., "Speaking to his supporters on the coldest winter day recorded in 30 years, Bernie Sanders called out Clinton . . . "). For example, the interactive media guidance application may determine that the time stamp associated with the text segment is Jan. 11, 2016.

The interactive media guidance application determines the meaning of the first unknown term by accessing a second knowledge graph associated with the first context term and related to the time stamp to determine the potential term that is the meaning of the first unknown term. Association between entities changes over time. The second knowledge graph, because it is associated with a specific time related to the time stamp rather than all time periods, captures the temporal dimension of associations between entities. For example, if news that school boy "Ryan Clinton" donated his lunch money to the Bernie Sanders campaign was trending during one specific week, the association between the terms "Bernie Sanders" and "Ryan Clinton" would be strong in a knowledge graph derived solely from a corpus associated with that week. However, the association between the same two terms would be weak in a knowledge graph (e.g., the first knowledge graph) derived from a corpus over all periods of time.

The interactive media guidance application, by accessing the second knowledge graph related to the time stamp, is able to determine associations that were most important during a time period relevant to the text segment. For example, the second knowledge graph associated with the first context term "Bernie Sanders" and related to the time stamp Jan. 11, 2016, may be a knowledge graph capturing information from news articles, social media and other corpus during the week leading up to Jan. 11, 2016. Techniques by which the interactive media guidance application may determine from the second knowledge graph the potential term that is the meaning of the first unknown term discussed previously are applicable here.

In some embodiments, the second knowledge graph is associated with a specific time interval whose position is determined based on the time stamp of the text segment. For example, the specific time interval may be a week. The specific time interval may be a default time interval. By using a specific time interval, the interactive media guidance application is able to limit the amount of corpus that the knowledge graph is derived from, facilitating the identification of trending associations. The position of the specific time interval is determined based on the time stamp to ensure that the second knowledge graph is derived from the corpus most likely to help disambiguate ambiguous terms in the text segment. From the previous example, where the time stamp was Jan. 11, 2016, the interactive media guidance application may determine the position of the week is to be the week leading up to Jan. 11, 2016. In this case, the interactive media guidance application would access the second knowledge graph derived from corpus from the week of Jan. 4-11, 2016.

In some embodiments, the duration of the specific time interval associated with the second knowledge graph is shorter than duration of time interval associated with the first knowledge graph. For example, the first knowledge graph may be a static knowledge graph derived from corpus spanning years. The second knowledge graph, on the other hand, may be a temporal knowledge graph derived from a corpus associated with a certain day.

In some embodiments, the position of the specific time interval associated with the second knowledge graph is such that the specific time interval associated with the second knowledge graph overlaps with the time stamp. The overlap between the specific time interval and the time stamp may be partial or complete. For example, the time stamp may be Jan. 11, 2016 and the specific time interval may be Jan. 7-14, 2016. For example, the time stamp may be Jan. 11-Mar. 11, 2016 and the specific time interval may be Jan. 1-31, 2016. In some embodiments, the position of the specific time interval associated with the second knowledge graph is such that the specific time interval associated with the second knowledge graph precedes the time stamp of the text segment. For example, the text segment containing the ambiguous term may be a natural language query about a past event, received on Jan. 11, 2016. In this case, the specific time interval associated with the second knowledge graph may be Jan. 3-6, 2016. In some embodiments, the position of the specific time interval associated with the second knowledge graph is such that the specific time interval associated with the second knowledge graph follows the time stamp of the text segment. For example, the text segment containing the ambiguous term may be a social media post at 3:33 pm, Jan. 11, 2016. The interactive media guidance application may determine that social media posts written in response to the original social media post would be the best corpus to derive the second knowledge graph from. Accordingly, the specific time interval associated with the second knowledge graph may be 3:34 pm-6:00 pm, Jan. 11, 2016.

In some embodiments, duration of the specific time interval is based in part on time indicators identified by analyzing the text segment. For example, the interactive media guidance application may use text mining techniques to identify time indicators (e.g., today, during the week of, all of last month, during the past two years etc.) that may be present in a text segment and that may be associated with the ambiguous term. For example, the interactive media guidance application may analyze the natural language query "What did Clinton say to Bernie Sanders at the fund raiser today?" and determine "today" is a time indicator associated with the ambiguous term "Clinton." The interactive media guidance application may determine, based on the time indicator "today" that the duration of the specific time interval should be a day.

In some embodiments, duration of the specific time interval is based in part on source of the text segment. For example, the interactive media guidance application may determine the source of the text segment is a daily newspaper (e.g., the New York Times). In this case, the interactive media guidance application may set the duration of the specific time interval to be a week as the daily newspaper is most likely to refer to events that happened during the past few days. If the interactive media guidance application determines that the source of the text segment is a microblog platform (e.g., Twitter) where topics being discussed change more frequently, the interactive media guidance application may set the duration of the specific time interval to be a day. For natural language queries received from a user, the interactive media guidance application may identify the user (e.g., by using user profile information). The interactive media guidance application may then use information associated with the user (e.g., query history associated with the user profile, media consumption patterns and other such information) to determine the duration of the specific time interval. For example, the interactive media guidance application may determine that a query is received from user Tommy. The interactive media guidance application may determine from Tommy's user profile that he predominantly reads daily newspapers and has frequent queries related to events in these newspapers. In this case, the interactive media guidance application may determine that an ambiguous term in Tommy's query is most likely to refer to recent events and set the specific time interval to be a week.

In some embodiments, the interactive media guidance application determines that the first knowledge graph does not include any potential term that could be the meaning of the first unknown term. For example, for the text segment "Megan Kelly, Bernie Sander, and Clinton were all at the debate," the interactive media guidance application may identify "Clinton" as the unknown term and "Megan Kelly" as the first context term. The interactive media guidance application may access the first knowledge graph associated with the first context term "Megan Kelly" to determine that there is a no potential term in the first knowledge graph that could be the meaning of the unknown term "Clinton." The interactive media guidance application may then identify a second context term in the text segment. For example, the interactive media guidance application may identify "Bernie Sanders" as the second context term.

In some embodiments, the interactive media guidance application determines the meaning of the first unknown term based on the second context term. In this case, the interactive media guidance application may determine the meaning of the first unknown term "Clinton" based on the second context term "Bernie Sanders" by accessing a knowledge graph associated with Bernie Sanders. Upon determining the term "Clinton" is ambiguous, the interactive media guidance application may access another knowledge graph associated with the term "Bernie Sanders" and related to the stamp associated with the time stamp of the text segment to determine the meaning of the term "Clinton."

In some embodiments, the interactive media guidance application may determine that the second knowledge graph includes more than one potential term that could be the meaning of the first unknown term. For example, for the text segment "Bernie Sanders has just called out Clinton for soliciting donations from banks and corporations," the interactive media guidance application may determine that the second knowledge graph contains the terms "Hillary Clinton" and "Bill Clinton," both of which could be the meaning of the first unknown term. In some embodiments, the interactive media guidance application may adjust at least one of duration of the specific time interval and the position of the specific time interval. The interactive media guidance application may change (i.e., increase or decrease) the duration of the specific time interval while keeping the position constant. Alternatively, the interactive media guidance application may keep the duration of the specific time interval constant while changing the position of the specific time interval. In some embodiments, the interactive media guidance application may change both the duration and position of the specific time interval.

For example, the time stamp of the text segment may have been Jan. 11, 2016, the duration of the specific time interval may have been one week and the position of the specific time interval may have been such that its end point coincided with the time stamp. In this case, the second knowledge graph would be derived from a corpus from Jan. 5-11, 2016. Because this second knowledge graph includes more than one potential term that could be the meaning of the first unknown term "Clinton," the interactive media guidance application may decrease the duration of the specific time interval to be three days so that the specific time interval now ranges from Jan. 9-11, 2016 (e.g., to limit the amount of extraneous corpus). Alternatively, the interactive media guidance application may keep the duration of the specific time interval constant at seven days and change the position so that the starting point of the specific time interval coincides with the time stamp (i.e., the specific time interval is now Jan. 11-17, 2016).

In some embodiments, the interactive media guidance application may determine the meaning of the first unknown term by accessing a third knowledge graph associated with the first context term and the specific time interval to determine the potential term that is the meaning of the first unknown term. For example, the interactive media guidance application may access a third knowledge graph associated with the adjusted specific time interval Jan. 9-11, 2016 to determine the potential term that is the meaning of the first unknown term "Clinton." Techniques by which the interactive media guidance application may determine from the third knowledge graph the potential term that is the meaning of the first unknown term discussed previously are applicable here.

In some embodiments, the interactive media guidance application determines that the second knowledge graph does not include any potential term that could be the meaning of the first unknown term. For example, the interactive media guidance application may determine that there is no term that is similar to the unknown term "Clinton" in the second knowledge graph. The interactive media guidance application may adjust at least one of duration of the specific time interval and the position of the specific time interval. From the previous example, the specific time interval may be Jan. 5-11, 2016. The interactive media guidance application may increase the duration of the specific time interval to two weeks to incorporate more corpus. In this case, the specific time interval now ranges from Dec. 29, 2015-Jan. 11, 2016.

In some embodiments, the interactive media guidance application may determine the meaning of the first unknown term by accessing a fourth knowledge graph associated with the first context term and the specific time interval to determine the potential term that is the meaning of the first unknown term. For example, the interactive media guidance application may access a fourth knowledge graph associated with the adjusted specific time interval Dec. 29, 2015-Jan. 11, 2016 to determine the potential term that is the meaning of the first unknown term "Clinton."

As the amount of natural language text increases, the number of meanings that could be associated with a term increases, resulting in an increase in the number of ambiguous terms. This makes the task of identifying the correct meaning associated with an ambiguous term more complex. For example, the system may receive a natural language text query "Who are the major donors for Bernie Sanders and Clinton campaigns?" In this case, it is necessary for the system to identify which "Clinton" is being referred to in the query in order to minimize the probability of providing a wrong answer. Similarly, if a system is analyzing the text segment "Clinton received a major donation from the Koch brothers," the system must determine which "Clinton" is being referred to in the text segment to determine whether "Koch brothers" should be included in the query result. Incorrect assignment of meanings to ambiguous terms can decrease the efficiency of natural language processing and have detrimental impact on the user experience.

Conventional systems are limited to identifying the meaning of an ambiguous term in a text segment using context terms and knowledge graphs that are associated with all periods of time (e.g., static knowledge graphs). However, because associations between terms change over time and static knowledge graphs fail to capture this temporal dimension, conventional systems are not able to identify associations that are most relevant at a given point in time. Consequently, conventional systems miss key inferences and frequently assign erroneous meanings to ambiguous terms.

Systems and methods provided herein address this issue by using context terms, static knowledge graphs and temporal knowledge graphs to identify the meaning of an ambiguous term in a text segment. Temporal knowledge graphs capture the relationships between the context term and the various meanings of the ambiguous terms during a specific time period. By using a temporal knowledge graph related to the time stamp of the text segment, the systems and methods are able to identify which associations were most relevant at the time of the text segment and determine the meaning of the ambiguous term based on these associations.

It should be noted that the systems, methods, apparatuses, and/or aspects described above may be applied to, or used in accordance with, other systems, methods, apparatuses, and/or aspects described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 6 shows an illustrative embodiment of a display screen that may be used to provide media guidance application listings and other media guidance information, in accordance with some embodiments of the disclosure;

FIG. 7 shows another illustrative embodiment of a display screen that may be used to provide media guidance application listings, in accordance with some embodiments of the disclosure;

DETAILED DESCRIPTION

The described systems and methods provide for determining a meaning of an ambiguous term in a text segment based on a context term, a static knowledge graph, and a temporal knowledge graph. These systems and methods, upon identifying an unknown term in a text segment, analyze the text segment for a context term. The systems and methods access a first knowledge graph (i.e., the static knowledge graph) associated with the context term to determine a potential term that is the meaning of the unknown term. The systems and methods determine that the unknown term is an ambiguous term upon determining that there is more than one potential term in the first knowledge graph that could be the meaning of the unknown term. In this case, the systems and methods take into account the temporal dimension of relationships between entities for disambiguating the meaning of the unknown term. The systems and methods achieve this by determining a time stamp of the text segment and accessing a second knowledge graph (i.e., the temporal knowledge graph) associated with the first context term and related to the time stamp to determine the potential term that is the meaning of the first unknown term.

As referred to herein, an "interactive media guidance application," or a "media guidance application" or, sometimes, a "guidance application" is an application that allows a user to consume, and/or navigate to content. In some embodiments, the media guidance application may be provided as an online application (i.e., provided on a website), or as a stand-alone application on a server, user device. In some embodiments, control circuitry installed on various devices and platforms may execute the media guidance application, as described in more detail below. In some embodiments, the media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and nonvolatile computer memory or storage devices such as a hard disk, floppy disk, USB drive, DVD, CD, media card, register memory, processor caches, Random Access Memory ("RAM").

Figure 1:
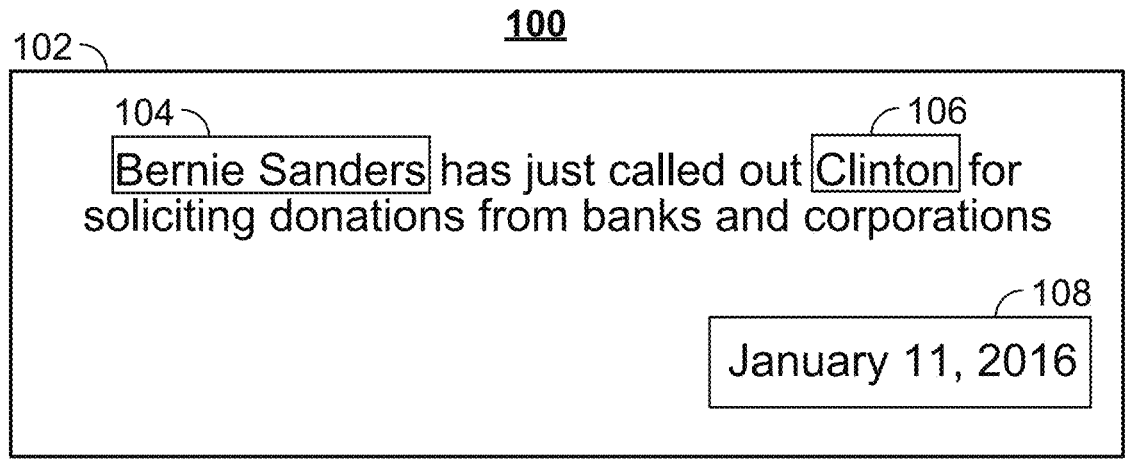
FIG. 1 depicts an illustrative display of the interactive media guidance application in accordance with some embodiments of the disclosure.

FIG. 1 depicts an illustrative display of the interactive media guidance application in accordance with some embodiments of the disclosure. FIG. 1 depicts an illustrative display 100 which may be displayed on any user device (e.g., user television equipment 902, user computer equipment 904, or wireless user communications device 906, described in FIG. 9 below). Control circuitry 804 may cause displays to be displayed on display 812 using the one or more of the processes described in FIGS. 10-11.

Display 100 is an example of a display generated by the interactive media guidance application for presenting a text segment to a user. Display 100 includes the text segment "Bernie Sanders has just called out Clinton for soliciting donations from banks and corporations" 102. The interactive media guidance application identifies a first unknown term in the text segment "Bernie Sanders has just called out Clinton for soliciting donations from banks and corporations" 102. The interactive media guidance application may determine that the term "Clinton" 106 has no metadata or identifier tag associated with it that provides its meaning. In this case, the interactive media guidance application determines that the term "Clinton" 106 is a first unknown term. The interactive media guidance application analyzes the text segment "Bernie Sanders has just called out Clinton for soliciting donations from banks and corporations" 102 for a first context term. The interactive media guidance application may use text mining techniques (e.g., named entity recognition, coreference, sentiment analysis, semantic analysis, and other text mining techniques) to determine the first context term. For example, the interactive media guidance application identifies "Bernie Sanders" 104 as the first context term. Display 100 also includes a time stamp "Jan. 11, 2016" associated with the text segment "Bernie Sanders has just called out Clinton for soliciting donations from banks and corporations" 102.

Figure 2:
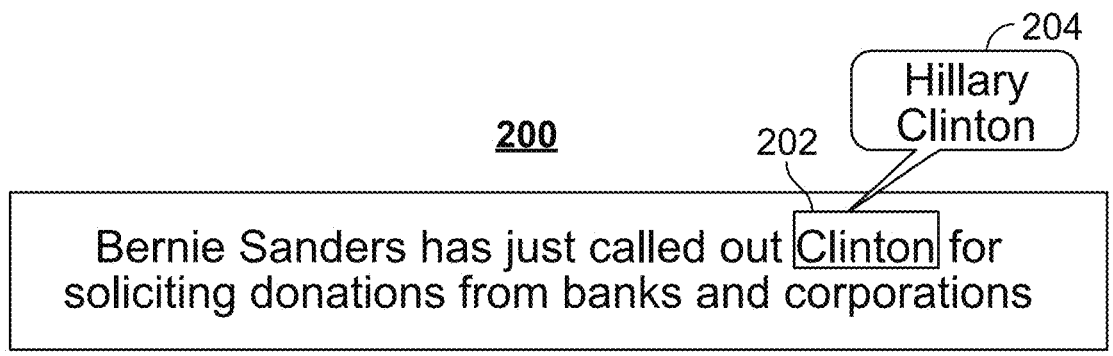
FIG. 2 depicts another illustrative display of the interactive media guidance application in accordance with some embodiments of the disclosure.

FIG. 2 depicts another illustrative display of the interactive media guidance application in accordance with some embodiments of the disclosure. FIG. 2 depicts an illustrative display 200 which may be displayed on any user device (e.g., user television equipment 902, user computer equipment 904, and wireless user communications device 906, described in FIG. 9 below). Control circuitry 804 may cause displays to be displayed on display 812 using the one or more of the processes described in FIGS. 10-11.

Display 200 is an example of a display generated by the interactive media guidance application for presenting the user with the meaning of the first unknown term in the text segment. The interactive media guidance application may determine using the first context term "Bernie Sanders" 104 and the first and second knowledge graphs that the meaning of the first unknown term "Clinton" 202 is "Hillary Clinton" 204. The interactive media guidance application may display the meaning "Hillary Clinton" 204 as a pop-up display when the user selects the first unknown term "Clinton" 202 via user input interface 810. The interactive media guidance application may also generate for display the meaning "Hillary Clinton" 204 without requiring any input from the user.

Figure 3:
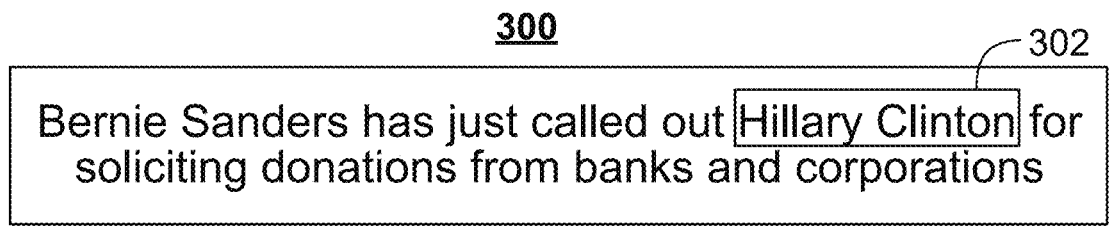
FIG. 3 depicts yet another illustrative display of the interactive media guidance application in accordance with some embodiments of the disclosure.

FIG. 3 depicts another illustrative display of the interactive media guidance application in accordance with some embodiments of the disclosure. FIG. 3 depicts an illustrative display 300 which may be displayed on any user device (e.g., user television equipment 902, user computer equipment 904, and wireless user communications device 906, described in FIG. 9 below). Control circuitry 804 may cause displays to be displayed on display 812 using the one or more of the processes described in FIGS. 10-11.

Display 300 is another example of a display generated by the interactive media guidance application for presenting the user with the meaning of the first unknown term in the text segment. In some embodiments, the interactive media guidance application may substitute the first unknown term "Clinton" 106 in the text segment "Bernie Sanders has just called out Clinton for soliciting donations from banks and corporations" 102 with the meaning "Hillary Clinton" 302.

The interactive media guidance application determines a meaning of the first unknown term by accessing a first knowledge graph associated with the first context term to identify a potential term that is the meaning of the first unknown term. For example, the first knowledge graph associated with the first context term "Bernie Sanders" 104 may be derived from a general knowledge corpus such as Wikipedia.

Figure 4:
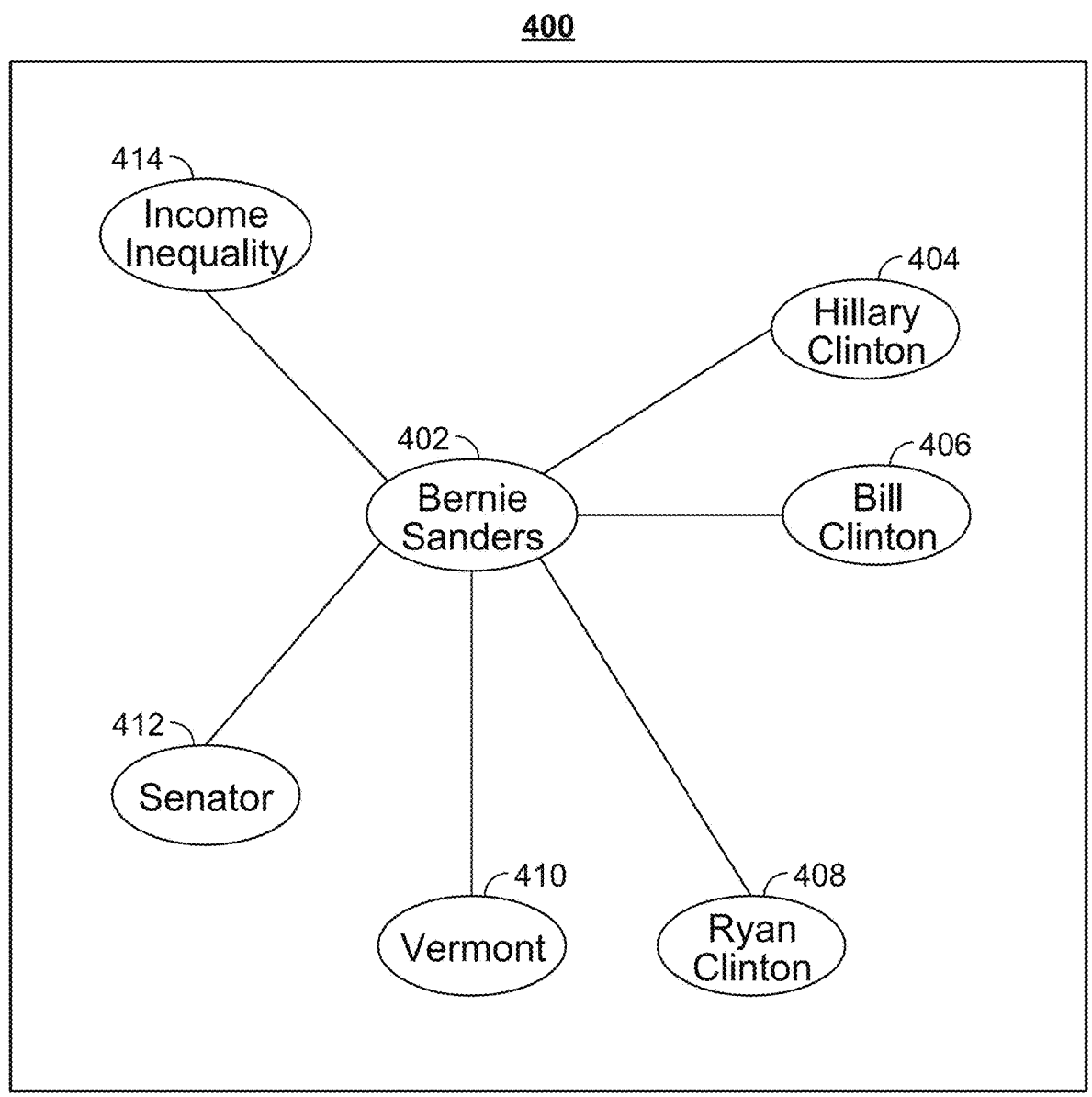
FIG. 4 shows an illustrative embodiment of portion of a knowledge graph associated with a first context term in the text segment, in accordance with some embodiments of the disclosure.

FIG. 4 shows an illustrative embodiment of a portion of a knowledge graph associated with a first context term in the text segment, in accordance with some embodiments of the disclosure. Knowledge graphs and their features are described in greater detail in U.S. patent application Ser. No. 14/501,504, filed Sep. 30, 2014, U.S. patent application Ser. No. 14/500,309, filed Sep. 29, 30 2014, and U.S. patent application Ser. No. 14/448,308, filed Jul. 31, 2014, which are hereby incorporated by reference herein in their entireties. Knowledge graph 400 provides information about a multitude of entities and their relationships with other entities and may be derived from a corpus from a wide variety of sources. Knowledge graph 400 is composed of nodes and edges which represent information about relationships between different entities. Although the depicted knowledge graph 400 comprises nodes and edges, it is only an illustrative embodiment. Knowledge graph 400 can comprise of another suitable modes of representation of relationships between different entities without departing from the scope of this invention. For example, knowledge graph 400 may include databases, lists, and collections that represent objects and their associated relationships.

Knowledge graph 400 may be stored using storage circuitry 808. Data structures such as linked lists, trees, graphs, buckets or arrays may be used to represent knowledge graph 400 in storage circuitry 808. Knowledge graph 400 may be stored locally on user equipment device 800 or stored remotely and accessed through communications network 914. Knowledge graph 400 may be stored entirely in one location, or be split into sections and each section stored at one of a plurality of locations. In some embodiments, knowledge graph 400 may be generated dynamically upon request using content from of media content source 916 and media guidance data source 918.

Knowledge graph 400 is an example of the first knowledge graph associated with the first context term "Bernie Sanders" 104 accessed by the interactive media guidance application. Knowledge graph 400 includes node "Bernie Sanders" 402 which corresponds to the first context term "Bernie Sanders" 104. Knowledge graph 400 also includes node "Hillary Clinton" 404, node "Bill Clinton" 406, node "Ryan Clinton" 408, node "Vermont" 410, node "Senator" 412 and node "Income inequality" 414. The interactive media guidance application may identify, in knowledge graph 400, a potential term that could be the meaning of the unknown term based on similarity between the potential term and the unknown term. The interactive media guidance application may identify node "Bill Clinton" 406, node "Hillary Clinton" 404 and node "Ryan Clinton" 408 as potential terms because of their similarity to the first unknown term "Clinton" 106.

In some embodiments, the interactive media guidance application may use strength of association between a term and the first context term as a second step to filter out the most likely potential terms. Strength of association may be an inverse of the normalized distance of the edge between two terms in the knowledge graph 400. For example, normalized strength of association between node "Bernie Sanders" 402 and each of node "Bill Clinton" 406, node "Hillary Clinton" 404 and node "Ryan Clinton" 408 is 0.7, 0.7 and 0.2 respectively. If required threshold strength of association is 0.5, then the interactive media guidance application may determine, based on the knowledge graph 400, that node "Bill Clinton" 406 and node "Hillary Clinton" 404 are potential terms that could be the meaning of the first unknown term "Clinton" 106.

The interactive media guidance application determines whether the first knowledge graph includes more than one potential term that could be the meaning of the first unknown term. For example, the interactive media guidance application may use a Boolean comparison function to determine whether the value of a counter corresponding to the number of potential terms in knowledge graph 400 is greater than one. Upon determining that knowledge graph 400 includes more than one potential term that could be the meaning of the first unknown term, the interactive media guidance application determines a time stamp associated with the text segment. The time stamp can be any period of time, depending on the origin and content of the text segment. For example, if the text segment is a report detailing changes in campaign donation policies during 2010 to 2016, the time stamp may be 2010 to 2016. For a social media status update (e.g., a Twitter post) or a natural language query, the time stamp may be the exact date and time of the update or query. The time stamp is used to derive information about the time that the content of the text segment relates to.

The interactive media guidance application may use metadata associated with the text segment to determine the time stamp. The interactive media guidance application may retrieve metadata associated with the text segment by querying a database (e.g., database located at media content source 916 or media guidance data source 918) for the metadata corresponding to the text segment. Alternatively, the interactive media guidance application may use text mining techniques to extract time indicators from the text segment itself. For example, the text segment may contain dates of events detailed in the text segment (e.g., "On Jan. 11, 2016, Bernie Sanders called out Clinton . . . ") or other contextual information that may be used to extrapolate the time stamp (e.g., "Speaking to his supporters on the coldest winter day recorded in 30 years, Bernie Sanders called out Clinton . . . "). In this case, the interactive media guidance application may determine that the time stamp associated with the text segment 102 to be "Jan. 11, 2016" 108.

The interactive media guidance application determines the meaning of the first unknown term by accessing a second knowledge graph associated with the first context term and related to the time stamp to determine the potential term that is the meaning of the first unknown term. Association between entities changes over time. The second knowledge graph, because it is associated with a specific time related to the time stamp rather than all time periods, captures the temporal dimension of associations between entities. For example, if news that school boy "Ryan Clinton" donated his lunch money to the Bernie Sanders campaign was trending during one specific week, the association between the terms "Bernie Sanders" and "Ryan Clinton" would be strong in a knowledge graph derived solely from a corpus associated with that specific week and non-existent in a knowledge graph derived solely from a corpus associated other weeks. In a knowledge graph derived from a corpus over all periods of time however, there will be a weak association between the two terms because they shared a strong association at one point in time.

The interactive media guidance application, by accessing the second knowledge graph related to the time stamp, is able to determine associations that were most important during a time period relevant to the text segment. For example, the second knowledge graph associated with the first context term "Bernie Sanders" 104 and related to the time stamp "Jan. 11, 2016" 108 may be a knowledge graph capturing information from news articles, social media and other corpora during the week leading up to Jan. 11, 2016. An example of the second knowledge graph is knowledge graph 500 depicted in FIG. 5.

Figure 5:
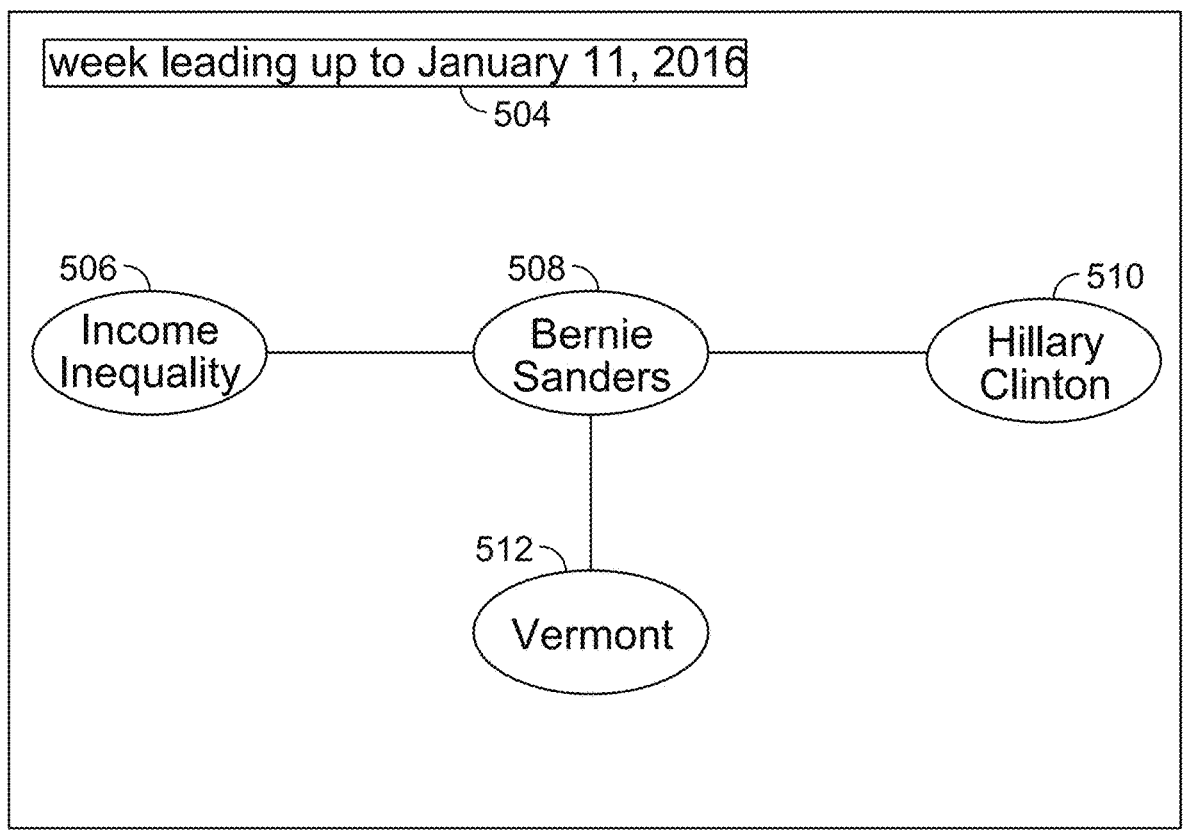
FIG. 5 shows another illustrative embodiment of a portion of a knowledge graph associated with the first context term in a text segment, in accordance with some embodiments of the disclosure.

FIG. 5 shows another illustrative embodiment of portion of a knowledge graph associated with the first context term in a text segment, in accordance with some embodiments of the disclosure. Knowledge graph 500 provides information about a multitude of entities and their relationships with other entities during a time related to the time stamp "Jan. 11, 2016" 108. The depicted knowledge graph 500 is only an illustrative embodiment and knowledge graph 500 can comprise another suitable modes of representation of relationships between different entities without departing from the scope of this invention.

Knowledge graph 500 may be stored using storage circuitry 808. Data structures such as linked lists, trees, graphs, buckets or arrays may be used to represent knowledge graph 500 in storage circuitry 808. Knowledge graph 500 may be stored locally on user equipment device 800 or stored remotely and accessed through communications network 914. Knowledge graph 500 may be stored entirely in one location, or be split into sections and each section stored at one of a plurality of locations. In some embodiments, knowledge graph 500 may be generated dynamically upon request using content from media content source 916 and media guidance data source 918.

Knowledge graph 500 associated with specific time interval "week leading up to Jan. 11, 2016" 504 includes node "Bernie Sanders" 508 which corresponds to the first context term "Bernie Sanders" 104. Knowledge graph 500 also includes node "Income inequality" 506, node "Vermont" 512 and node "Hillary Clinton" 510. The interactive media guidance application may identify node "Hillary Clinton" 510 as the meaning of the first unknown term, using techniques discussed previously.

In some embodiments, the second knowledge graph is associated with a specific time interval whose position is determined based on the time stamp of the text segment. For example, the specific time interval may be a week. The specific time interval may be a default time interval. By using a specific time interval, the interactive media guidance application is able to limit the amount of corpus that the knowledge graph 500 is derived from, facilitating the identification of trending associations. The position is the specific time interval is determined based on the time stamp 108 to ensure that the second knowledge graph, knowledge graph 500, is derived from the corpus most likely to help disambiguate ambiguous terms in the text segment 102. For example, based on "Jan. 11, 2016" time stamp 108, the interactive media guidance application may determine the position of the week is to be the week leading up to Jan. 11, 2016. In this case, the interactive media guidance application would access the second knowledge graph, knowledge graph 500, derived from a corpus from the week of Jan. 5-11, 2016.

In some embodiments, the duration of the specific time interval associated with the second knowledge graph is shorter than the duration of time interval associated with the first knowledge graph. For example, the first knowledge graph, knowledge graph 400, may be a static knowledge graph derived from a corpus spanning years. The second knowledge graph (knowledge graph 500), on the other hand, may be a temporal knowledge graph derived from a corpus associated with a certain day.

In some embodiments, the position of the specific time interval associated with the second knowledge graph is such that the specific time interval associated with the second knowledge graph overlaps with the time stamp. The overlap between the specific time interval and the time stamp may be partial or complete. For example, the time stamp 108 may be Jan. 11, 2016 and the specific time interval may be Jan. 7-14, 2016. As another example, the time stamp may be Jan. 11-Mar. 11, 2016 and the specific time interval may be Jan. 1-31, 2016. In some embodiments, the position of the specific time interval associated with the second knowledge graph is such that the specific time interval associated with the second knowledge graph precedes the time stamp of the text segment. For example, the text segment containing the ambiguous term may be a natural language query about a past event, received on Jan. 11, 2016. In this case, the specific time interval associated with the second knowledge graph may be Jan. 3-6, 2016. In some embodiments, the position of the specific time interval associated with the second knowledge graph is such that the specific time interval associated with the second knowledge graph follows the time stamp of the text segment. For example, the text segment 102 containing the ambiguous term may be a social media post at 3:33 pm, Jan. 11, 2016. The interactive media guidance application may determine that social media posts written in response to the original social media post would be the best corpus to derive the second knowledge graph (knowledge graph 500) from. Accordingly, the specific time interval associated with the second knowledge graph may be 3:34 pm-6:00 pm, Jan. 11, 2016.

In some embodiments, duration of the specific time interval is based in part on time indicators identified by analyzing the text segment. For example, the interactive media guidance application may use text mining techniques to identify time indicators (e.g., today, during the week of, all of last month, during the past two years and other suitable time indicators) that may be present in a text segment and that may be associated with the ambiguous term. For example, the interactive media guidance application may analyze the natural language query "What did Clinton say to Bernie Sanders at the fund raiser today?" and determine "today" is a time indicator associated with the ambiguous term "Clinton." The interactive media guidance application may determine, based on the time indicator "today" that the duration of the specific time interval should be a day.

In some embodiments, duration of the specific time interval is based in part on the source of the text segment. For example, the interactive media guidance application may determine the source of the text segment 102 is a daily newspaper (e.g., the New York Times). In this case, the interactive media guidance application may set the duration of the specific time interval to be a week as the daily newspaper is most likely to refer to events that happened during the past few days. If the interactive media guidance application determines that the source of the text segment 102 is a microblog platform (e.g., Twitter) where topics being discussed change more frequently, the interactive media guidance application may set the duration of the specific time interval to be a day. For natural language queries received from a user, the interactive media guidance application may identify the user (e.g., based on a unique identifier associated with the user such as a string of characters or bio-metric data). The interactive media guidance application may then use information associated with the user (e.g., query history associated with the user profile, media consumption patterns and other such information retrieved from storage 808) to determine the duration of the specific time interval. For example, the interactive media guidance application may determine that a query is received from user Tommy. The interactive media guidance application may determine from Tommy's user profile that he predominantly reads daily newspapers and has frequent queries related to events in these newspapers. In this case, the interactive media guidance application may determine that an ambiguous term in Tommy's query is most likely to refer to recent events and set the specific time interval to be a week.

In some embodiments, the interactive media guidance application determines that the first knowledge graph does not include any potential term that could be the meaning of the first unknown term. For example, for the text segment "Megan Kelly, Bernie Sanders and Clinton were all at the debate," the interactive media guidance application may identify "Clinton" as the unknown term and "Megan Kelly" as the first context term. The interactive media guidance application may access the first knowledge graph associated with the first context term "Megan Kelly" to determine that there is a no potential term in the first knowledge graph that could be the meaning of the unknown term "Clinton." The interactive media guidance application may then identify a second context term in the text segment. For example, the interactive media guidance application may identify "Bernie Sanders" as the second context term.

In some embodiments, the interactive media guidance application determines the meaning of the first unknown term based on the second context term. In this case, the interactive media guidance application may determine the meaning of the first unknown term "Clinton" based on the second context term "Bernie Sanders" by accessing a knowledge graph associated with Bernie Sanders. Upon determining the term "Clinton" is ambiguous, the interactive media guidance application may access another knowledge graph associated with the term "Bernie Sanders" and related to the stamp associated with the time stamp of the text segment to determine the meaning of the term "Clinton."

In some embodiments, the interactive media guidance application may determine that the second knowledge graph includes more than one potential term that could be the meaning of the first unknown term. For example, for the text segment "Bernie Sanders has just called out Clinton for soliciting donations from banks and corporations," the interactive media guidance application may determine that the second knowledge graph contains the terms "Hillary Clinton" and "Bill Clinton," both of which could be the meaning of the first unknown term. In some embodiments, the interactive media guidance application may adjust at least one of duration of the specific time interval and the position of the specific time interval. The interactive media guidance application may change (i.e., increase or decrease) the duration of the specific time interval while keeping the position constant. Alternatively, the interactive media guidance application may keep the duration of the specific time interval constant while changing the position of the specific time interval. In some embodiments, the interactive media guidance application may change both the duration and position of the specific time interval.

For example, the time stamp of the text segment may have been Jan. 11, 2016, the duration of the specific time interval may have been one week and the position of the specific time interval may have been such that its end point coincided with the time stamp. In this case, the second knowledge graph would be derived from a corpus from Jan. 5-11, 2016. Because this second knowledge graph includes more than one potential term that could be the meaning of the first unknown term "Clinton," the interactive media guidance application may decrease the duration of the specific time interval to be three days so that the specific time interval now ranges from Jan. 9-11, 2016 (e.g., to limit the amount of extraneous corpus). Alternatively, the interactive media guidance application may keep the duration of the specific time interval constant at seven days and change the position so that the starting point of the specific time interval coincides with the time stamp (i.e. the specific time interval is now Jan. 11-17, 2016).

In some embodiments, the interactive media guidance application may determine the meaning of the first unknown term by accessing a third knowledge graph associated with the first context term and the specific time interval to determine the potential term that is the meaning of the first unknown term. For example, the interactive media guidance application may access a third knowledge graph associated with the adjusted specific time interval Jan. 9-11, 2016 to determine the potential term that is the meaning of the first unknown term "Clinton." Techniques by which the interactive media guidance application may determine from the third knowledge graph the potential term that is the meaning of the first unknown term discussed previously are applicable here.

In some embodiments, the interactive media guidance application determines that the second knowledge graph does not include any potential term that could be the meaning of the first unknown term. For example, the interactive media guidance application may determine that there is no term that is similar to the unknown term "Clinton" in the second knowledge graph. The interactive media guidance application may adjust at least one of duration of the specific time interval and the position of the specific time interval. From the previous example, the specific time interval may be Jan. 5-11, 2016. The interactive media guidance application may increase the duration of the specific time interval to two weeks to incorporate more corpus. In this case, the specific time interval now ranges from Dec. 29, 2015-Jan. 11, 2016.

In some embodiments, the interactive media guidance application may determine the meaning of the first unknown term by accessing a fourth knowledge graph associated with the first context term and the specific time interval to determine the potential term that is the meaning of the first unknown term. For example, the interactive media guidance application may access a fourth knowledge graph associated with the adjusted specific time interval Dec. 29, 2015-Jan. 11, 2016 to determine the potential term that is the meaning of the first unknown term "Clinton."

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

FIGS. 6-7 show illustrative display screens that may be used to provide media guidance data. The display screens shown in FIGS. 6-7 may be implemented on any suitable user equipment device or platform. While the displays of FIGS. 6-7 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 6 shows illustrative grid of a program listings display 600 arranged by time and channel that also enables access to different types of content in a single display. Display 600 may include grid 602 with: (1) a column of channel/content type identifiers 604, where each channel/content type identifier (which is a cell in the column) identifies a different channel or content type available; and (2) a row of time identifiers 606, where each time identifier (which is a cell in the row) identifies a time block of programming. Grid 602 also includes cells of program listings, such as program listing 608, where each listing provides the title of the program provided on the listing's associated channel and time. With a user input device, a user can select program listings by moving highlight region 610. Information relating to the program listing selected by highlight region 610 may be provided in program information region 612. Region 612 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 602 may provide media guidance data for non-linear programming including on-demand listing 614, recorded content listing 616, and Internet content listing 618. A display combining media guidance data for content from different types of content sources is sometimes referred to as a "mixed-media" display. Various permutations of the types of media guidance data that may be displayed that are different than display 600 may be based on user selection or guidance application definition (e.g., a display of only recorded and broadcast listings, only on-demand and broadcast listings, etc.). As illustrated, listings 614, 616, and 618 are shown as spanning the entire time block displayed in grid 602 to indicate that selection of these listings may provide access to a display dedicated to on-demand listings, recorded listings, or Internet listings, respectively. In some embodiments, listings for these content types may be included directly in grid 602. Additional media guidance data may be displayed in response to the user selecting one of the navigational icons 620. (Pressing an arrow key on a user input device may affect the display in a similar manner as selecting navigational icons 620.)

Display 600 may also include video region 622, advertisement 624, and options region 626. Video region 622 may allow the user to view and/or preview programs that are currently available, will be available, or were available to the user. The content of video region 622 may correspond to, or be independent from, one of the listings displayed in grid 602. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 624 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 602. Advertisement 624 may also be for products or services related or unrelated to the content displayed in grid 602. Advertisement 624 may be selectable and provide further information about content, provide information about a product or a service, enable purchasing of content, a product, or a service, provide content relating to the advertisement, etc. Advertisement 624 may be targeted based on a user's profile/preferences, monitored user activity, the type of display provided, or on other suitable targeted advertisement bases.

While advertisement 624 is shown as rectangular or banner shaped, advertisements may be provided in any suitable size, shape, and location in a guidance application display. For example, advertisement 624 may be provided as a rectangular shape that is horizontally adjacent to grid 602. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 626 may allow the user to access different types of content, media guidance application displays, and/or media guidance application features. Options region 626 may be part of display 600 (and other display screens described herein), or may be invoked by a user by selecting an on-screen option or pressing a dedicated or assignable button on a user input device. The selectable options within options region 626 may concern features related to program listings in grid 602 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 9. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 7. Video mosaic display 700 includes selectable options 702 for content information organized based on content type, genre, and/or other organization criteria. In display 700, television listings option 704 is selected, thus providing listings 706, 708, 710, and 712 as broadcast program listings. In display 700 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 708 may include more than one portion, including media portion 714 and text portion 716. Media portion 714 and/or text portion 716 may be selectable to view content in full-screen or to view information related to the content displayed in media portion 714 (e.g., to view listings for the channel that the video is displayed on).

The listings in display 700 are of different sizes (i.e., listing 706 is larger than listings 708, 710, and 712), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 8:
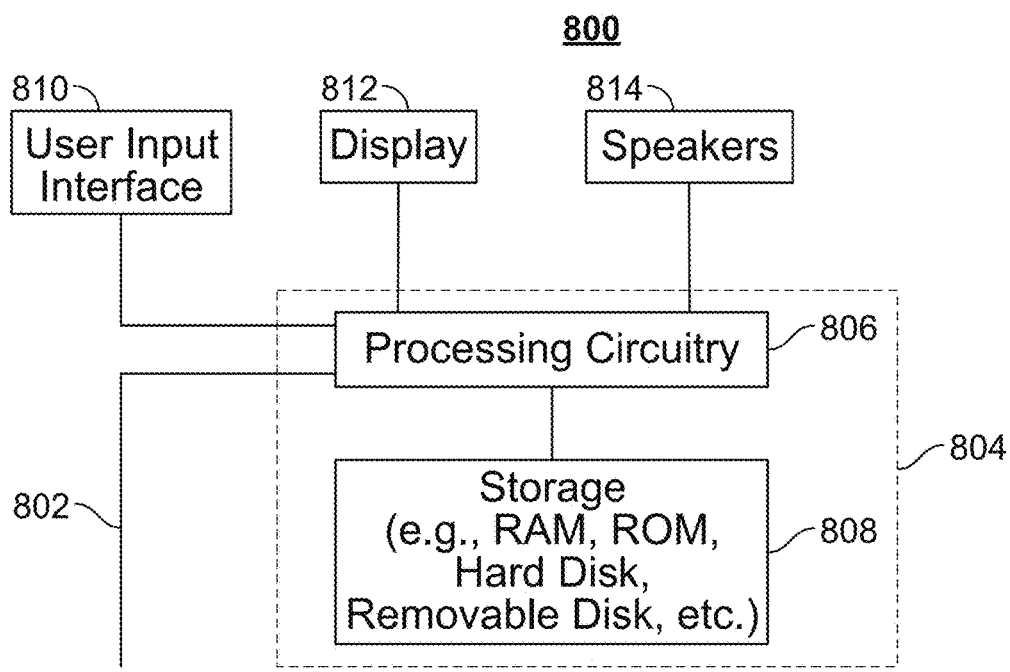
FIG. 8 is a block diagram of an illustrative user equipment (UE) device in accordance with some embodiments of the disclosure.

Users may access content and the media guidance application (and its display screens described above and below) from one or more of their user equipment devices. FIG. 8 shows a generalized embodiment of illustrative user equipment device 800. More specific implementations of user equipment devices are discussed below in connection with FIG. 9. User equipment device 800 may receive content and data via input/output (hereinafter "I/O") path 802. I/O path 802 may provide content (e.g., broadcast programming, on-demand programming, Internet content, content available over a local area network (LAN) or wide area network (WAN), and/or other content) and data to control circuitry 804, which includes processing circuitry 806 and storage 808. Control circuitry 804 may be used to send and receive commands, requests, and other suitable data using I/O path 802. I/O path 802 may connect control circuitry 804 (and specifically processing circuitry 806) to one or more communications paths (described below). I/O functions may be provided by one or more of these communications paths, but are shown as a single path in FIG. 8 to avoid overcomplicating the drawing.

Control circuitry 804 may be based on any suitable processing circuitry such as processing circuitry 806. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 804 executes instructions for a media guidance application stored in memory (i.e., storage 808). Specifically, control circuitry 804 may be instructed by the media guidance application to perform the functions discussed above and below. For example, the media guidance application may provide instructions to control circuitry 804 to generate the media guidance displays. In some implementations, any action performed by control circuitry 804 may be based on instructions received from the media guidance application.

In client-server based embodiments, control circuitry 804 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 9). In addition, communications circuitry may include circuitry that enables peer-to-peer communication of user equipment devices, or communication of user equipment devices in locations remote from each other (described in more detail below).

Memory may be an electronic storage device provided as storage 808 that is part of control circuitry 804. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 808 may be used to store various types of content described herein as well as media guidance data described above. Nonvolatile memory may also be used (e.g., to launch a boot-up routine and other instructions). Cloud-based storage, described in relation to FIG. 9, may be used to supplement storage 808 or instead of storage 808.

Control circuitry 804 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 804 may also include scaler circuitry for upconverting and downconverting content into the preferred output format of the user equipment 800. Circuitry 804 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 808 is provided as a separate device from user equipment 800, the tuning and encoding circuitry (including multiple tuners) may be associated with storage 808.

A user may send instructions to control circuitry 804 using user input interface 810. User input interface 810 may be any suitable user interface, such as a remote control, mouse, trackball, keypad, keyboard, touch screen, touchpad, stylus input, joystick, voice recognition interface, or other user input interfaces. Display 812 may be provided as a stand-alone device or integrated with other elements of user equipment device 800. For example, display 812 may be a touchscreen or touch-sensitive display. In such circumstances, user input interface 810 may be integrated with or combined with display 812. Display 812 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 812 may be HDTV-capable. In some embodiments, display 812 may be a 3D display, and the interactive media guidance application and any suitable content may be displayed in 3D. A video card or graphics card may generate the output to the display 812. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 804. The video card may be integrated with the control circuitry 804. Speakers 814 may be provided as integrated with other elements of user equipment device 800 or may be stand-alone units. The audio component of videos and other content displayed on display 812 may be played through speakers 814. In some embodiments, the audio may be distributed to a receiver (not shown), which processes and outputs the audio via speakers 814.

The guidance application may be implemented using any suitable architecture. For example, it may be a stand-alone application wholly-implemented on user equipment device 800. In such an approach, instructions of the application are stored locally (e.g., in storage 808), and data for use by the application is downloaded on a periodic basis (e.g., from an out-of-band feed, from an Internet resource, or using another suitable approach). Control circuitry 804 may retrieve instructions of the application from storage 808 and process the instructions to generate any of the displays discussed herein. Based on the processed instructions, control circuitry 804 may determine what action to perform when input is received from input interface 810. For example, movement of a cursor on a display up/down may be indicated by the processed instructions when input interface 810 indicates that an up/down button was selected.

In some embodiments, the media guidance application is a client-server based application. Data for use by a thick or thin client implemented on user equipment device 800 is retrieved on-demand by issuing requests to a server remote to the user equipment device 800. In one example of a client-server based guidance application, control circuitry 804 runs a web browser that interprets web pages provided by a remote server. For example, the remote server may store the instructions for the application in a storage device. The remote server may process the stored instructions using circuitry (e.g., control circuitry 804) and generate the displays discussed above and below. The client device may receive the displays generated by the remote server and may display the content of the displays locally on equipment device 800. This way, the processing of the instructions is performed remotely by the server while the resulting displays are provided locally on equipment device 800. Equipment device 800 may receive inputs from the user via input interface 810 and transmit those inputs to the remote server for processing and generating the corresponding displays. For example, equipment device 800 may transmit a communication to the remote server indicating that an up/down button was selected via input interface 810. The remote server may process instructions in accordance with that input and generate a display of the application corresponding to the input (e.g., a display that moves a cursor up/down). The generated display is then transmitted to equipment device 800 for presentation to the user.

In some embodiments, the media guidance application is downloaded and interpreted or otherwise run by an interpreter or virtual machine (run by control circuitry 804). In some embodiments, the guidance application may be encoded in the ETV Binary Interchange Format (EBIF), received by control circuitry 804 as part of a suitable feed, and interpreted by a user agent running on control circuitry 804. For example, the guidance application may be an EBIF application. In some embodiments, the guidance application may be defined by a series of JAVA-based files that are received and run by a local virtual machine or other suitable middleware executed by control circuitry 804. In some of such embodiments (e.g., those employing MPEG-2 or other digital media encoding schemes), the guidance application may be, for example, encoded and transmitted in an MPEG-2 object carousel with the MPEG audio and video packets of a program.

Figure 9:
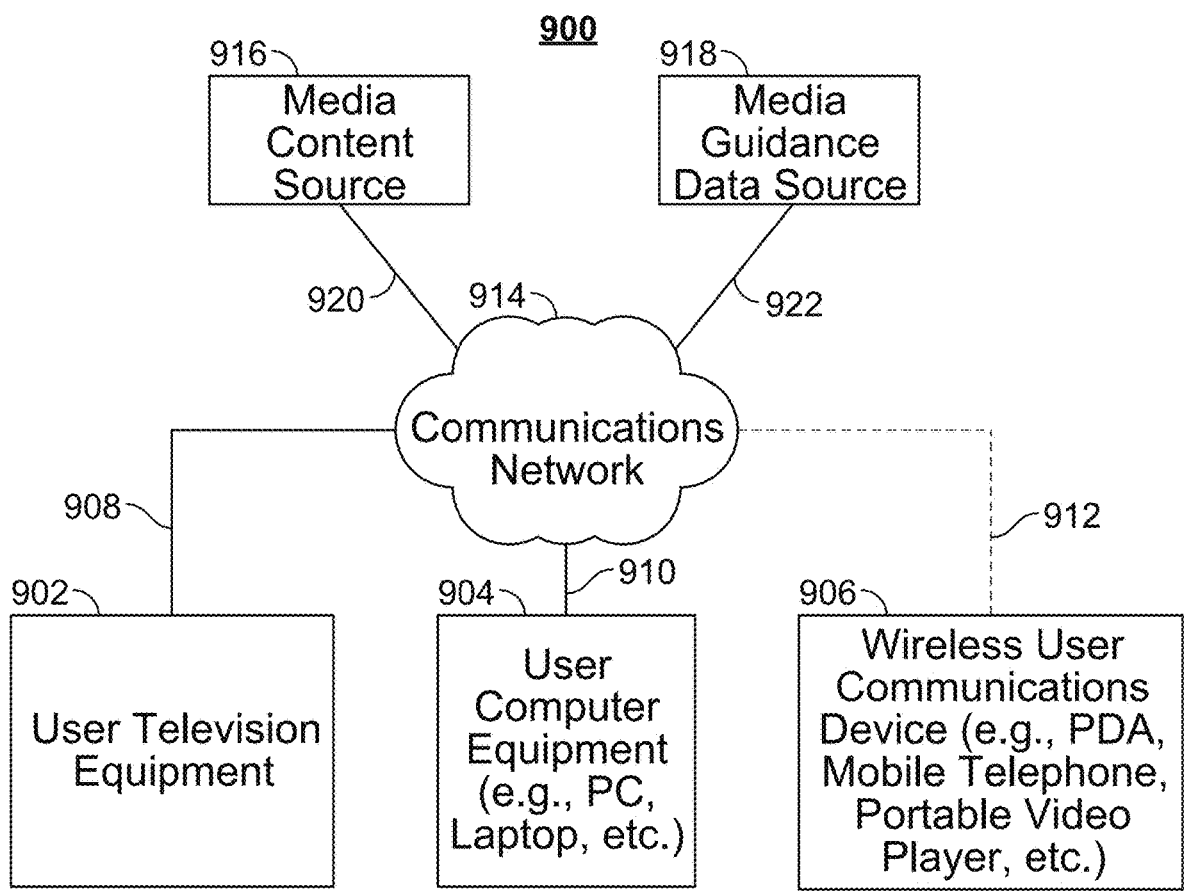
FIG. 9 is a block diagram of an illustrative media system in accordance with some embodiments of the disclosure.

User equipment device 800 of FIG. 8 can be implemented in system 900 of FIG. 9 as user television equipment 902, user computer equipment 904, wireless user communications device 906, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 8 may not be classified solely as user television equipment 902, user computer equipment 904, or a wireless user communications device 906. For example, user television equipment 902 may, like some user computer equipment 904, be Internet-enabled allowing for access to Internet content, while user computer equipment 904 may, like some user television equipment 902, include a tuner allowing for access to television programming. The media guidance application may have the same layout on various different types of user equipment or may be tailored to the display capabilities of the user equipment. For example, on user computer equipment 904, the guidance application may be provided as a web site accessed by a web browser. In another example, the guidance application may be scaled down for wireless user communications devices 906.

In system 900, there is typically more than one of each type of user equipment device but only one of each is shown in FIG. 9 to avoid overcomplicating the drawing. In addition, each user may utilize more than one type of user equipment device and also more than one of each type of user equipment device.

In some embodiments, a user equipment device (e.g., user television equipment 902, user computer equipment 904, wireless user communications device 906) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 914. Namely, user television equipment 902, user computer equipment 904, and wireless user communications device 906 are coupled to communications network 914 via communications paths 908, 910, and 912, respectively. Communications network 914 may be one or more networks including the Internet, a mobile phone network, mobile voice or data network (e.g., a 4G or LTE network), cable network, public switched telephone network, or other types of communications network or combinations of communications networks. Paths 908, 910, and 912 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 912 is drawn with dotted lines to indicate that in the exemplary embodiment shown in FIG. 9 it is a wireless path and paths 908 and 910 are drawn as solid lines to indicate they are wired paths (although these paths may be wireless paths, if desired). Communications with the user equipment devices may be provided by one or more of these communications paths, but are shown as a single path in FIG. 9 to avoid overcomplicating the drawing.

Although communications paths are not drawn between user equipment devices, these devices may communicate directly with each other via communication paths, such as those described above in connection with paths 908, 910, and 912, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 914.

System 900 includes content source 916 and media guidance data source 918 coupled to communications network 914 via communication paths 920 and 922, respectively. Paths 920 and 922 may include any of the communication paths described above in connection with paths 908, 910, and 912. Communications with the content source 916 and media guidance data source 918 may be exchanged over one or more communications paths, but are shown as a single path in FIG. 9 to avoid overcomplicating the drawing. In addition, there may be more than one of each of content source 916 and media guidance data source 918, but only one of each is shown in FIG. 9 to avoid overcomplicating the drawing. (The different types of each of these sources are discussed below.) If desired, content source 916 and media guidance data source 918 may be integrated as one source device. Although communications between sources 916 and 918 with user equipment devices 902, 904, and 906 are shown as through communications network 914, in some embodiments, sources 916 and 918 may communicate directly with user equipment devices 902, 904, and 906 via communication paths (not shown) such as those described above in connection with paths 908, 910, and 912.

Content source 916 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 916 may be the originator of content (e.g., a television broadcaster, a Webcast provider, etc.) or may not be the originator of content (e.g., an on-demand content provider, an Internet provider of content of broadcast programs for downloading, etc.). Content source 916 may include cable sources, satellite providers, on-demand providers, Internet providers, over-the-top content providers, or other providers of content. Content source 916 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 918 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 918 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 918 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 918 may provide user equipment devices 902, 904, and 906 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 808, and executed by control circuitry 804 of a user equipment device 800. In some embodiments, media guidance applications may be client-server applications where only a client application resides on the user equipment device, and server application resides on a remote server. For example, media guidance applications may be implemented partially as a client application on control circuitry 804 of user equipment device 800 and partially on a remote server as a server application (e.g., media guidance data source 918) running on control circuitry of the remote server. When executed by control circuitry of the remote server (such as media guidance data source 918), the media guidance application may instruct the control circuitry to generate the guidance application displays and transmit the generated displays to the user equipment devices. The server application may instruct the control circuitry of the media guidance data source 918 to transmit data for storage on the user equipment. The client application may instruct control circuitry of the receiving user equipment to generate the guidance application displays.

Content and/or media guidance data delivered to user equipment devices 902, 904, and 906 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 900 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 9.

In one approach, user equipment devices may communicate with each other within a home network. User equipment devices can communicate with each other directly via short-range point-to-point communication schemes described above, via indirect paths through a hub or other similar device provided on a home network, or via communications network 914. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 916 to access content. Specifically, within a home, users of user television equipment 902 and user computer equipment 904 may access the media guidance application to navigate among and locate desirable content. Users may also access the media guidance application outside of the home using wireless user communications devices 906 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 914. These cloud resources may include one or more content sources 916 and one or more media guidance data sources 918. In addition or in the alternative, the remote computing sites may include other user equipment devices, such as user television equipment 902, user computer equipment 904, and wireless user communications device 906. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 904 or wireless user communications device 906 having content capture feature. Alternatively, the user can first transfer the content to a user equipment device, such as user computer equipment 904. The user equipment device storing the content uploads the content to the cloud using a data transmission service on communications network 914. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 8.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 10:
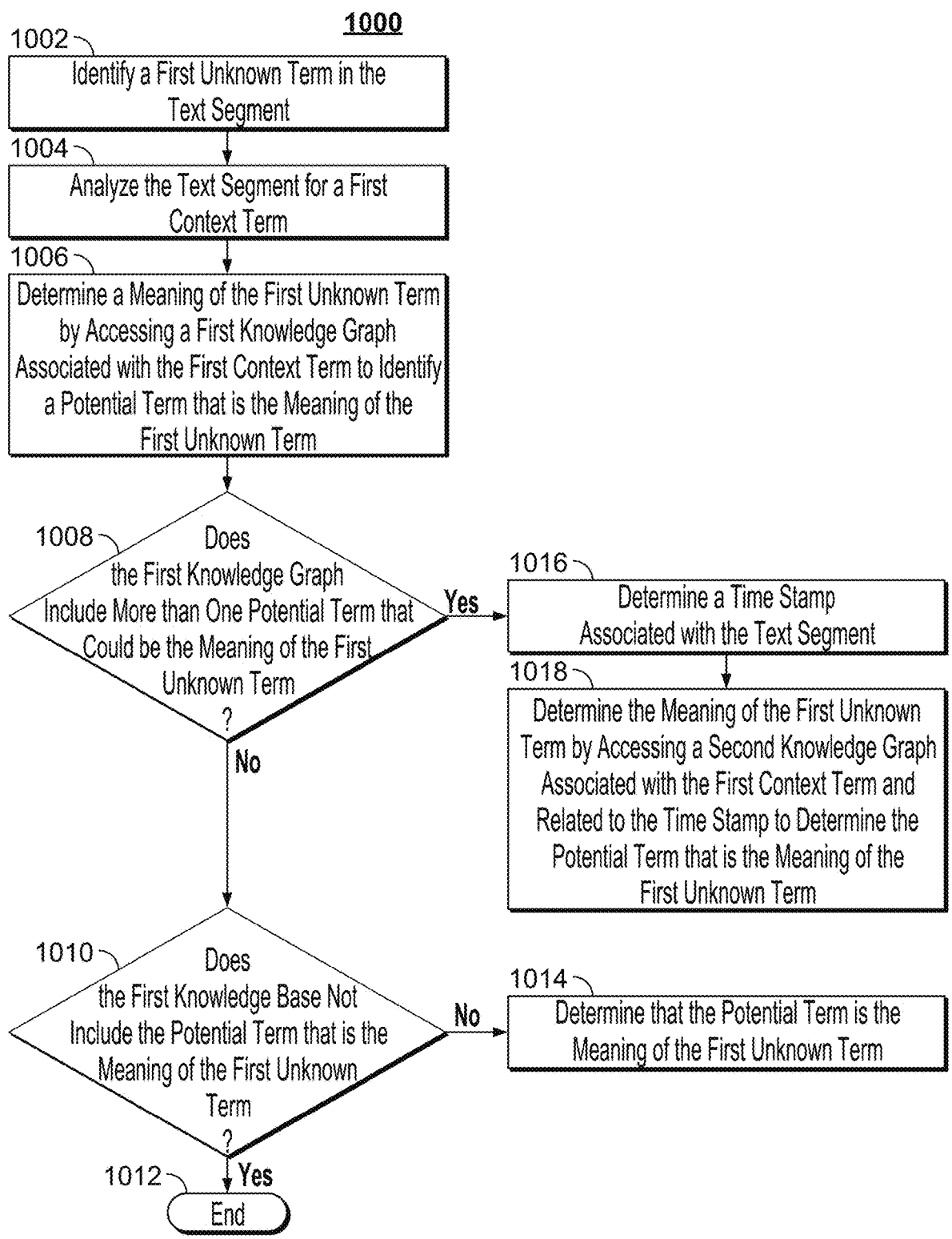
FIG. 10 is a flowchart of illustrative steps involved in determining a meaning of the first unknown term in the text segment based on a first context term and a temporal knowledge graph in accordance with some embodiments of the disclosure.

FIG. 10 is a flowchart of illustrative steps involved in determining a meaning of the first unknown term in the text segment based on a first context term and a temporal knowledge graph in accordance with some embodiments of the disclosure. Process 1000 may be used to determine whether an unknown term is ambiguous and determine the meaning of the unknown term. It should be noted that process 1000 or any step thereof could be performed on, or provided by, any of the devices shown in FIGS. 8-9. For example, process 1000 may be executed by control circuitry 804 (FIG. 8) as instructed by the interactive media guidance application implemented on user equipment 902, 904, and/or 906 (FIG. 9). In addition, one or more steps of process 1000 may be incorporated into or combined with one or more steps of any other process or embodiment.

Process 1000 begins at 1002 where control circuitry 804 identifies a first unknown term in the text segment. For example, control circuitry 804 may identify the term "Clinton" 106 as the first unknown term in the text segment "Bernie Sanders has just called out Clinton for soliciting donations from banks and corporations" 102. Process 1000 continues to 1004 where control circuitry 804 analyzes the text segment for a first context term. The interactive media guidance application may use text mining techniques to determine the first context term in text segment 102. Control circuitry 804 may identify "Bernie Sanders" 104 as the first context term. Process 1000 continues to 1006 where control circuitry 804 determines a meaning of the first unknown term by accessing a first knowledge graph associated with the first context term to identify a potential term that is the meaning of the first unknown term. For example, control circuitry 804 may access knowledge graph 400 to identify a potential term that is the meaning of the first unknown term "Clinton" 106. Process 1000 continues to 1008 where control circuitry 804 determines whether the first knowledge graph includes more than one potential term that could be the meaning of the first unknown term. For example, control circuitry 804 may use a Boolean comparison function to determine whether the value of a counter corresponding to the number of potential terms in knowledge graph 400 is greater than one.

If, at 1008 control circuitry 804 determines that the first knowledge graph includes more than one potential term that could be the meaning of the first unknown term, process 1000 continues onto 1016. At 1016, control circuitry 804 determines a time stamp associated with the text segment. For example, control circuitry 804 may determine that the time stamp associated with the text segment 102 to be "Jan. 11, 2016" 108. Process 1000 continues to 1018 where control circuitry 804 determines the meaning of the first unknown term by accessing a second knowledge graph associated with the first context term and related to the time stamp to determine the potential term that is the meaning of the first unknown term. For example, control circuitry 804 may access knowledge graph 500 which is associated with the first context term "Bernie Sanders" 104 and related to the time stamp "Jan. 11, 2016" 108 to determine the potential term that is the meaning of the first unknown term "Clinton" 106. Control circuitry 804 may identify node "Hillary Clinton" 510 in knowledge graph 500 as the meaning of the first unknown term "Clinton" 106, using techniques discussed previously.

If, at 1008 control circuitry 804 determines that the first knowledge graph does not include more than one potential term that could be the meaning of the first unknown term, process 1000 continues onto 1010. At 1010, control circuitry 804 determines whether the first knowledge base does not include the potential term that is the meaning of the first unknown term. If, at 1010 control circuitry 804 determines that the first knowledge base does not include the potential term that is the meaning of the first unknown term, process 1000 continues to 1012. At 1012, process 1010 terminates. If, at 1010 control circuitry 804 determines that the first knowledge base includes the potential term that is the meaning of the first unknown term, process 1000 continues to 1014. At 1014, control circuitry 804 determines that the potential term is the meaning of the first unknown term It is contemplated that the steps or descriptions of FIG. 10 may be used with any other embodiment of this disclosure. In addition, the steps and descriptions described in relation to FIG. 10 may be done in alternative orders or in parallel to further the purposes of this disclosure. For example, each of these steps may be performed in any order or in parallel or substantially simultaneously to reduce lag or increase the speed of the system or method.

Figure 11:
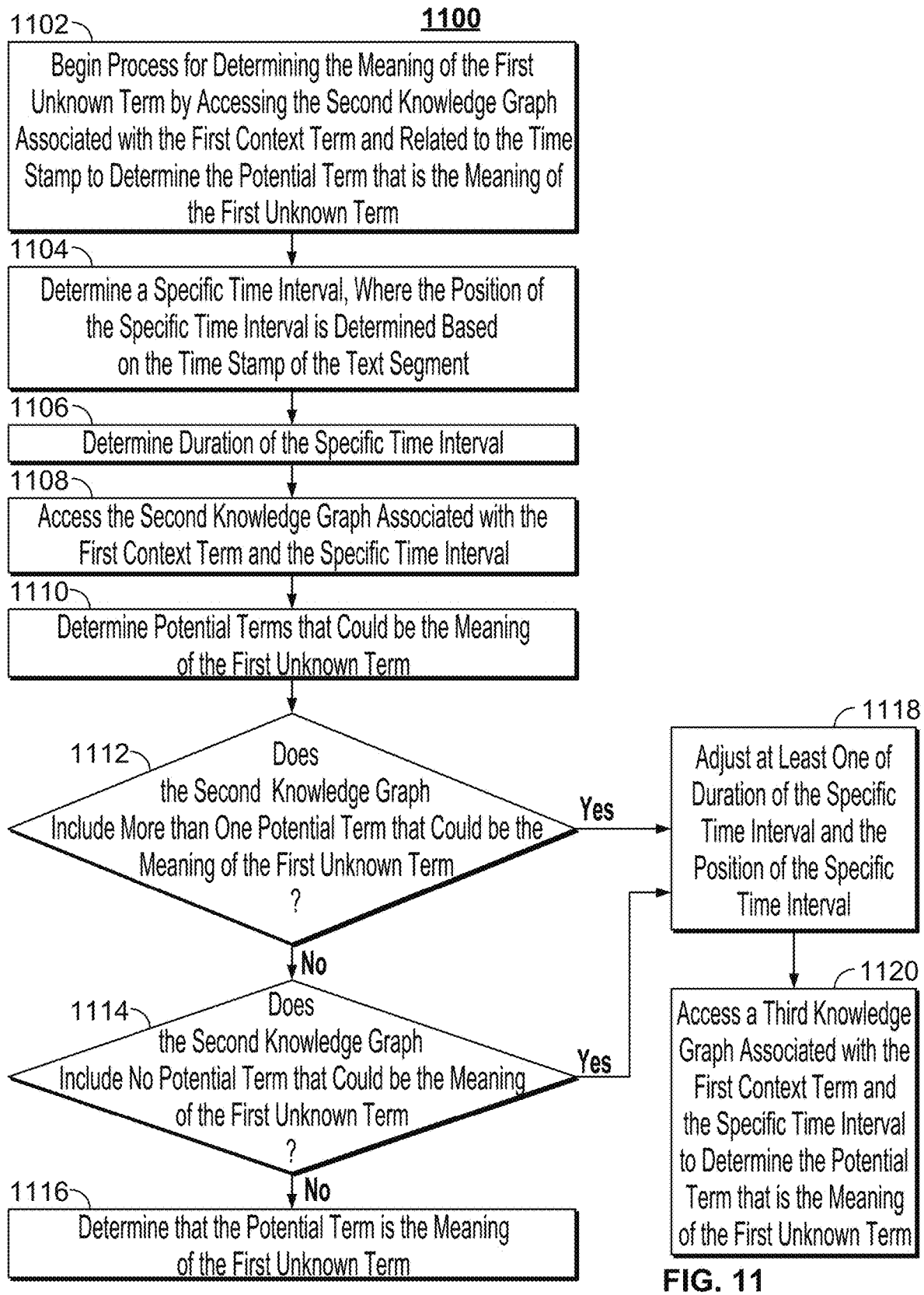
FIG. 11 is a flowchart of illustrative steps involved in step 1018 (FIG. 10) when determining the meaning of the first unknown term by accessing the second knowledge graph associated with the first context term and related to the time stamp of the text segment in accordance with some embodiments of the disclosure.

FIG. 11 is a flowchart of illustrative steps involved in step 1018 (FIG. 10) when determining the meaning of the first unknown term by accessing the second knowledge graph associated with the first context term and related to the time stamp of the text segment in accordance with some embodiments of the disclosure. It should be noted that process 1100 or any step thereof could be performed on, or provided by, any of the devices shown in FIGS. 8-9. For example, process 1100 may be executed by control circuitry 804 (FIG. 8) as instructed by the interactive media guidance application implemented on user equipment 902, 904, and/or 906 (FIG. 9). In addition, one or more steps of process 1100 may be incorporated into or combined with one or more steps of any other process or embodiment.

Process 1100 begins at 1102 where control circuitry 804 begins a process for determining the meaning of the first unknown term by accessing the second knowledge graph associated with the first context term and related to the time stamp to determine the potential term that is the meaning of the first unknown term. Process 1100 continues to 1104 where control circuitry 804 determines a specific time interval, where the position of the specific time interval is determined based on the time stamp of the text segment. The specific time interval may be a default time interval (e.g., two weeks). For example, the control circuitry 804 determined, based on "Jan. 11, 2016" time stamp 108, that the end point of the specific time interval should coincide with the time stamp 106. By using a specific time interval, the interactive media guidance application is able to limit the amount of corpus that the knowledge graph 500 is derived from, facilitating the identification of trending associations. Process 1100 continues to 1106.

At 1106, control circuitry 804 determines duration of the specific time interval. Control circuitry 804 may determine duration of the specific time interval based on time indicators identified by analyzing the text segment. Alternatively, control circuitry 804 may determine the duration of the specific time interval is based on the source of the text segment. For example, the control circuitry 804 may set the duration of the specific time interval to be a week. In this case, the specific time interval is Jan. 5-11, 2016. Process 1100 then continues to 1108. At 1108, control circuitry 804 accesses the second knowledge graph associated with the first context term and the specific time interval. For example, control circuitry 804 accesses knowledge graph 500 which is derived from a corpus from the week of Jan. 5-11, 2016 and associated with the first context term "Bernie Sanders" 104. Process 1100 continues to 1110 where control circuitry 804 determines potential terms that could be the meaning of the first unknown term. Techniques by which control circuitry 804 may perform this determination discussed previously are applicable here. For example, control circuitry 804 may determine from knowledge graph 500 that "Hillary Clinton" 510 is a potential term that could be the meaning of the first unknown term "Clinton" 106.

Process 1100 continues to 1112 where control circuitry 804 determines whether the second knowledge graph includes more than one potential term that could be the meaning of the first unknown term. Control circuitry 804 may use a Boolean comparison function to perform this determination. If, at 1112, control circuitry 804 determines that the second knowledge graph does not include more than one potential term that could be the meaning of the first unknown term, process 1100 continues to 1114. For example, control circuitry 804 may determine that knowledge graph 500 does not include more than one potential term that could be the meaning of the first unknown term "Clinton" 106. At 1114, control circuitry 804 determines whether the second knowledge graph includes no potential term that could be the meaning of the first unknown term. If, at 1114, control circuitry 804 determines that the second knowledge graph does include the potential term that could be the meaning of the first unknown term, process 1100 continues to 1116. For example, because knowledge graph 500 includes "Hillary Clinton" 510, control circuitry 804 may determine that knowledge graph 500 does include a potential term that could be the meaning of the first unknown term. At 1116, control circuitry 804 determines that the potential term is the meaning of the first unknown term. For example, control circuitry 804 determines that "Hillary Clinton" 510 is the meaning of the first unknown term "Clinton" 106.

If, at 1114, control circuitry 804 determines that the second knowledge graph does include the potential term that could be the meaning of the first unknown term, process 1100 continues to 1118. Additionally if, at 1112, control circuitry 804 determines that the second knowledge graph does include more than one potential term that could be the meaning of the first unknown term, process 1100 continues to 1118. At 1118, control circuitry 804 adjusts at least one of duration of the specific time interval and the position of the specific time interval. Process 1100 continues from 1118 to 1120. At 1120, control circuitry 804 accesses a third knowledge graph associated with the first context term and the specific time interval to determine the potential term that is the meaning of the first unknown term.

It is contemplated that the steps or descriptions of FIG. 11 may be used with any other embodiment of this disclosure. In addition, the steps and descriptions described in relation to FIG. 11 may be done in alternative orders or in parallel to further the purposes of this disclosure. For example, each of these steps may be performed in any order or in parallel or substantially simultaneously to reduce lag or increase the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of selecting meanings for terms susceptible to multiple meanings in a query submitted to an interactive media guidance application, the method comprising:
   identifying an unknown term in a query received through the media guidance application;
   determining a context and a time of the received query;
   using a first knowledge graph associated with the context to determine one or more meanings of the unknown term, the first knowledge graph defining a first set of potential meanings and associations therebetween; and
   in response to determining more than one meaning of the unknown term:
      using a second knowledge graph associated with a specific time interval corresponding with the time of the received query to select one meaning from the more than one meaning of the unknown term, the second knowledge graph defining a second set of potential meanings and associations therebetween;
      determining a result of the query based on the selected one meaning of the unknown term;
      determining that the second knowledge graph includes more than one meaning of the unknown term;
      adjusting at least one of a duration of the specific time interval and a position in time of the specific time interval;
      determining the meaning of the unknown term using a third knowledge graph associated with the context and the specific time interval to determine the meaning of the unknown term; and
   transmitting the result of the query in the media guidance application.

2. The method of claim 1, wherein the query is received through a voice recognition interface of the media guidance application.

3. The method of claim 1, wherein the query is a text query.

4. The method of claim 1, wherein the first set of potential meanings comprises a plurality of entities.

5. The method of claim 1, wherein the second set of potential meanings comprises a plurality of entities.

6. The method of claim 1, wherein the determining a context further comprises text mining the query.

7. The method of claim 1, further comprising:
   determining that the first knowledge graph does not include any meaning of the unknown term;
   identifying a further context of the query; and
   determining the meaning of the unknown term based on the further context.

8. A method of selecting meanings for terms susceptible to multiple meanings in a query submitted to an interactive media guidance application, the method comprising:
   identifying an unknown term in a query received through the media guidance application;
   determining a context and a time of the received query;
   using a first knowledge graph associated with the context to determine one or more meanings of the unknown term, the first knowledge graph defining a first set of potential meanings and associations therebetween; and
   in response to determining more than one meaning of the unknown term:
      using a second knowledge graph associated with a specific time interval corresponding with the time of the received query to select one meaning from the more than one meaning of the unknown term, the second knowledge graph defining a second set of potential meanings and associations therebetween;
      determining a result of the query based on the selected one meaning of the unknown term; and
      determining that the second knowledge graph does not include any meaning of the unknown term;
      adjusting at least one of a duration of the specific time interval and a position in time of the specific time interval;
      determining the meaning of the unknown term using a third knowledge graph associated with the context and the specific time interval to determine the meaning of the unknown term; and
   transmitting the result of the query in the media guidance application.

9. A system for selecting meanings for terms susceptible to multiple meanings in a query submitted to an interactive media guidance application, the system comprising:
   a storage device; and
   control circuitry configured to:
      identify an unknown term in a query received through the media guidance application;
      determine a context and a time of the received query;
      use a first knowledge graph associated with the context to determine one or more meanings of the unknown term, the first knowledge graph defining a first set of potential meanings and associations therebetween; and
      in response to determining more than one meaning of the unknown term:
         use a second knowledge graph associated with a specific time interval corresponding with the time of the received query to select one meaning from the more than one meaning of the unknown term, the second knowledge graph defining a second set of potential meanings and associations therebetween;

determine a result of the query based on the selected one meaning of the unknown term;

determine that the second knowledge graph includes more than one meaning of the unknown term;

adjust at least one of a duration of the specific time interval and a position in time of the specific time interval;

determine the meaning of the unknown term using a third knowledge graph associated with the context and the specific time interval to determine the meaning of the unknown term; and transmit the result of the query in the media guidance application.

10. The system of claim 9, wherein the query is received through a voice recognition interface of the media guidance application.

11. The system of claim 9, wherein the query is a text query.

12. The system of claim 9, wherein the first set of potential meanings comprises a plurality of entities.

13. The system of claim 9, wherein the second set of potential meanings comprises a plurality of entities.

14. The system of claim 9, wherein the determining a context further comprises text mining the query.

15. The system of claim 9, wherein the control circuitry is further configured to:

determine that the first knowledge graph does not include any meaning of the unknown term;

identify a further context of the query; and determine the meaning of the unknown term based on the further context.

16. A system for selecting meanings for terms susceptible to multiple meanings in a query submitted to an interactive media guidance application, the system comprising:

a storage device; and control circuitry configured to:

identify an unknown term in a query received through the media guidance application;

determine a context and a time of the received query;

use a first knowledge graph associated with the context to determine one or more meanings of the unknown term, the first knowledge graph defining a first set of potential meanings and associations therebetween; and in response to determining more than one meaning of the unknown term:

use a second knowledge graph associated with a specific time interval corresponding with the time of the received query to select one meaning from the more than one meaning of the unknown term, the second knowledge graph defining a second set of potential meanings and associations therebetween;

determine a result of the query based on the selected one meaning of the unknown term;

determine that the second knowledge graph does not include any meaning of the unknown term;

adjust at least one of a duration of the specific time interval and a position in time of the specific time interval;

determine the meaning of the unknown term using a third knowledge graph associated with the context and the specific time interval to determine the meaning of the unknown term; and transmit the result of the query in the media guidance application.

* * * * *